March 4, 1941.  V. A. HOOVER  2,233,890

ECCENTRIC SUSPENSION AND CABLE CONNECTION FOR SUBMERSIBLE MOTOR PUMPS

Filed Dec. 8, 1937  2 Sheets-Sheet 1

INVENTOR
Vaino A. Hoover
BY Lyon & Lyon
ATTORNEYS

March 4, 1941.                V. A. HOOVER                 2,233,890
ECCENTRIC SUSPENSION AND CABLE CONNECTION FOR SUBMERSIBLE MOTOR PUMPS
Filed Dec. 8, 1937                     2 Sheets—Sheet 2

INVENTOR
Vaino A. Hoover
BY Lyon & Lyon ATTORNEYS

Patented Mar. 4, 1941

2,233,890

UNITED STATES PATENT OFFICE 2,233,890

ECCENTRIC SUSPENSION AND CABLE CONNECTION FOR SUBMERSIBLE MOTOR PUMPS

Vaino A. Hoover, Los Angeles, Calif., assignor to Byron Jackson Co., Huntington Park, Calif., a corporation of Delaware Application December 8, 1937, Serial No. 178,742

4 Claims. (Cl. 174—8)

This invention relates to electrically driven motor pump units adapted to be suspended in a well and submerged in the fluid to be pumped. More particularly, the invention relates to means for making the connection between the electric cable and the motor in that type of submersible motor pump in which the motor is below the pump and the cable must necessarily pass the pump in order to reach the motor. The invention is particularly adapted for use with rotary or centrifugal pumps but is not limited to use therewith.

Large capacity pumps and motors are of relatively large diameter with respect to the diameter of the well casing through which they must pass. For maximum pump capacity, the pumps are normally but ¾" to 1" smaller than the inside diameter of the well casing. Inasmuch as the conventional round cables capable of transmitting the current required by the motor are usually from 2" to 2½" in diameter it is necessary to provide a flat cable for at least that portion of the line which passes the pump. It is an object of the present invention to provide a construction whereby a flat cable can be used where the cable passes the pump.

Standard round cables are preferred to flat cables where they can be used, because of their lesser cost. Round cables should be used, therefore, except where the cable passes the pump, this portion of the cable being flat. It therefore becomes necessary to provide means for making a water-tight connection between the round and flat cables. An object of the present invention is to provide such a connection.

Another object is to provide a motor pump and cable-connector construction such that the diameter of the pump discharge will not have to be unduly reduced to allow for the cable connector.

Another object is to provide a cable connection such that a water-tight connection can be made at the factory between each cable and its respective connector, and the connectors can be bolted together quickly to make a fluid-tight connection, in the field, by an ordinary mechanic, without any special tools.

Other objects and advantages will be apparent from the following description of a preferred embodiment of the invention.

Figures 1, 2:
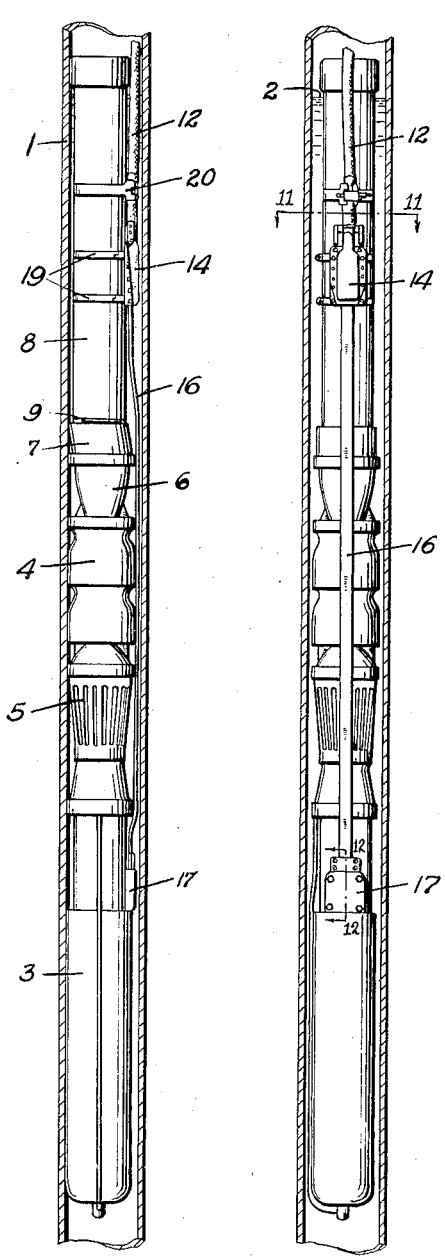
Figure 1 is an elevation of a submersible motor pump unit employing my novel cable connection.
Figure 2 is an elevation of the motor pump unit of Fig. 1 taken at a right angle to the view shown in Fig. 1.

Referring to Figs. 1 and 2, a well casing is indicated at 1 with the fluid level shown at 2. A submersible electric motor is indicated generally at 3 supported from a deep well pump 4 by means of the suction strainer 5. The pump 4 is supported from a flanged adapter 6. All of the members 3, 4, 5 and 6 are concentrically arranged with respect to the shaft axis of the pump and motor but are suspended eccentrically within the casing 1. This eccentric suspension is accomplished by means of an eccentric adapter flange 7, the flange of which registers with the upper end of the adapter 6 while the upper end is offset laterally of the shaft axis of the motor pump unit. The eccentric flange 7 is supported from the lower end of the pump discharge column 8 which extends to the top of the well. The discharge column 8 may be attached to the adapter flange 7 in any desired manner but it is preferred that it be threadedly connected to the female adapter as indicated at 9, to conserve space.

The construction described above is intended for use in a well wherein it is desired to develop the maximum capacity of the well. In order to develop the required capacity, a pump of maximum diameter must be used. Under such conditions, the pump is so large that it will just pass through the well casing 1. A large capacity pump, in turn, requires a discharge column 8 which is nearly as large in diameter as the pump, if the loss in the discharge column is to be limited to an acceptable value. In order to provide power to drive a pump of large capacity, an electric motor 3, of correspondingly large horsepower rating, is required. At the operating voltages which are available, a round polyphase power cable 12 of the required current capacity will have a diameter of 1⅛" to 2½" in the horsepower range of 5 to 200 H. P.

Thus it will be seen that if a round cable is to be used the discharge column 8 must be offset from the vertical axis of the well to allow the cable to pass, and to accommodate the cable connector box 14 which will be more fully described hereinafter. The cable connector box 14 serves to connect that portion of the cable which is attached to the motor pump unit, as shipped from the factory, to the cable which is installed in the well in the field. Obviously the connector box 14 will be as large if not larger in diameter than the cable 12. However, it is desirable to so construct the connector box that the size of the discharge column is limited only by the diameter of the round cable and not by the space required by the connector box.

Reference to Fig. 1 will disclose that if it is necessary to offset the discharge column 8 in order to accommodate the cable 12, the latter can not pass the pump 4, which is almost as large in diameter as the well casing 1. In order to carry the conductor past the pump to the motor and to provide sufficient capacity in the conductor a flat cable is used where the conductor passes the pump and motor. The flat cable is shown at 16 and is connected to the motor 3 by a special terminal box 17. The connector box 14 is secured to the pipe column 8 by means of the clamps 19 shown in more detail in Fig. 11. The round power cable 12 is secured to the pipe column 8 by means of a series of suitable cable clamps 20.

Figure 4:
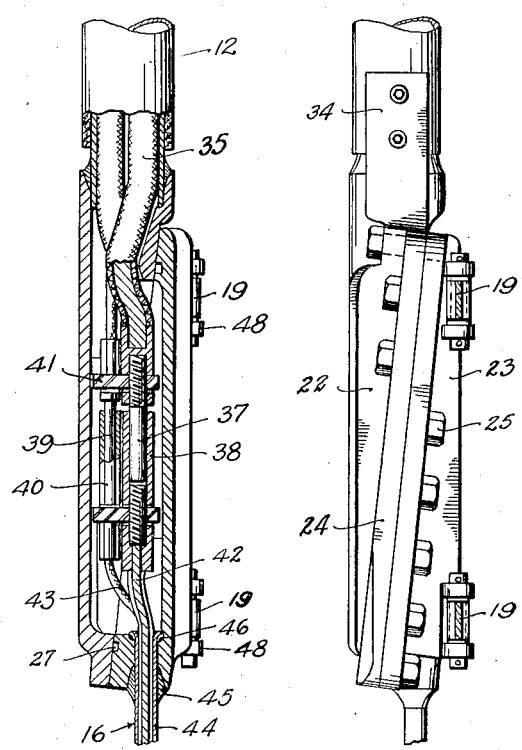
Figure 4 is a cross section of the cable connector box shown in Fig. 3 taken at a right angle to the view shown in Fig. 3.
Figure 5:
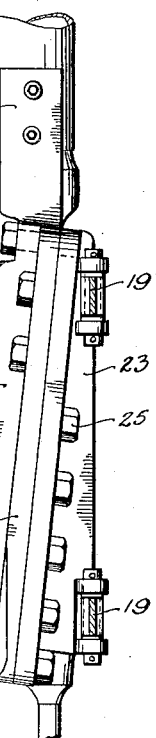
Figure 5 is a side view of the cable connector box shown in Fig. 3.
Figure 6:
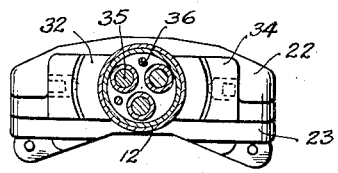
Figure 6 is a cross section taken on line 6—6 of Fig. 3.

The special cable connector box 14 is shown in detail in Figs. 3 to 10 inclusive. The problem in providing a suitable cable connector box is to keep the dimensions within the limits of the space formed between the well casing 1 and the offset discharge pipe 8 and to provide a connection that can be made in the field by an ordinary mechanic without the use of special tools. These requirements are met by the present design in which the connector box is formed by uniting two wedged-shaped housing members with the thin end of one member adjacent the thick end of the other member, the parting faces of the members being disposed in a plane on the diagonal of the connector box as shown in Fig. 5. The advantages of the diagonal split are (1) the connector box is full thickness at each end where the cables enter the box and (2) it is necessary to seal only a single plane surface so that a water tight seal can be made in the field without special tools. The connector box 14 may be used to connect two round cables or to connect a round cable to a flat cable. The latter arrangement is shown in the drawings, in which instance the half 22 of the connector box which is connected to the round cable is known as the round cable connector and the other half 23, connected to the flat cable, is known as the flat cable connector.

Figure 11:
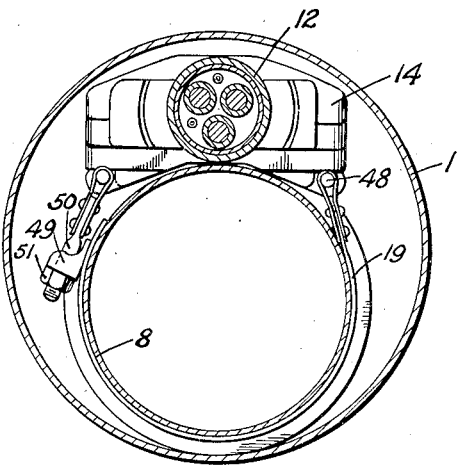
Figure 11 is a cross section taken on line 11—11 of Fig. 2 showing the clamp which secures the cable connector box to the discharge pipe.

As shown in Figs. 6 to 11, the outer face of the flat cable connector 23 is concave to conform generally to the contour of the discharge pipe to which it is clamped. The outer face of the round cable connector 22, however, is convex to conform to the inner surface of the well casing 1, the shape of the assembled box thus conforming substantially to the shape of the space between the well casing and the offset discharge pipe 8, as illustrated in Figure 11. This specific arrangement is particularly well adapted to receive a flat cable at its lower end and a round cable at its upper end. While the diagonal split provides substantially full thickness at each end, it will be observed from a comparison of Figures 6, 7, and 9 that the thickness of the lower end of connector 23 is materially less than the thickness of the upper end of connector 22, because of the concave contour of connector 23 and the convex contour of connector 22. The narrow space afforded in connector 23, however, is adequate to accommodate the flat cable 16, while the larger space required for reception of the round cable 12 is provided by the convex contour of connector 22.

Each of the connectors 22 and 23 is provided with a flat bolting flange 24 (Figures 3 and 5) adapted to be secured together by bolts or cap screws 25. A groove 26 is milled in the face of one of the flanges, preferably on connector 23, for the reception of a gasket 27. Preferably the gasket is of deformable material and of a shape not conforming to the shape of the groove; thus when the flanges are bolted together the gasket is compressed to the shape of the groove and is volumetrically confined therein.

A water-tight connection is formed between the round cable 12 and the upper end of connector 22, the latter being provided for this purpose with an upstanding annular flange 28 defining a cup-shaped pocket for the reception of the cable. The outer wrapping of the cable is removed to a point slightly above the top of the flange 28, exposing the lead sheath 29, which is metallically joined to the flange by sealing metal 30 filling the annular groove between the sheath and the flange and wiped to the lead sheath. The conductors embedded in the cable pass through an opening 31 below the flange 28. The cable is rigidly clamped to the connector independently of the seal by means of a pair of oppositely disposed clamping plates 32 pressed into engagement with the cable by pairs of set screws 33 in threaded engagement with lugs 34 projecting upwardly from the connector.

Figure 8:
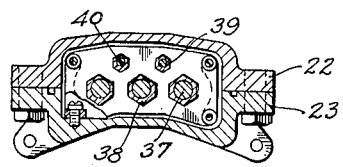
Figure 8 is a cross section taken on line 8—8 of Fig. 3.

In the present instance the cable 12 contains five conductors, three power conductors 35 leading to the windings of the motor 3, and two smaller control conductors 36, conductors 35 terminating in plugs 37 adapted to be inserted in sockets 38 and conductors 36 terminating in plugs 39 adapted to be inserted in sockets 40 the sockets 38 and 40 being mounted in the flat cable connector 23 and connected to the corresponding conductors in the flat cable 16. The three power conductor sockets 38 are arranged in linear series, with the control conductor sockets 40 disposed in a parallel series, as shown in Fig. 8. In order to maintain the plugs and sockets in axial alignment with each other so that they will engage when the connectors 22 and 23 are brought together by relative lengthwise movement, the plugs and sockets are rigidly mounted in their respective connectors by brackets 41, of Bakelite or other suitable insulating material.

Figure 9:
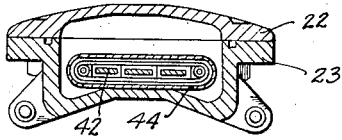
Figure 9 is a cross section taken on line 9—9 of Fig. 3.
Figure 7:
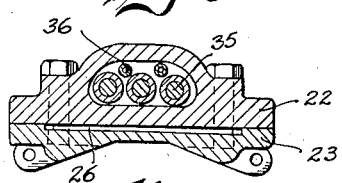
Figure 7 is a cross section taken on line 7—7 of Fig. 3.
Figure 10:
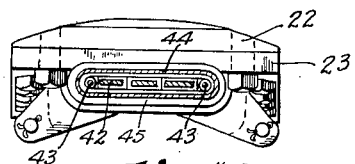
Figure 10 is a cross section taken on line 10—10 of Fig. 3.

The sockets 38 and 40 are connected respectively to conductors 42 and 43 embedded in the flat cable 16 (Fig. 9). The latter comprises a flattened copper tube 44 housing the conductors. The tube is inserted in an opening provided therefor in the lower end of connector 23, and is sealed thereto by a wiped metal seal 45, as shown in Fig. 4. The inner end of the tube may be swaged over an additional metal seal, as shown at 46, if desired.

The connectors 22 and 23 are preferably of bronze, which is capable of forming a wiped metal joint both with the lead sheath of the round cable and the copper sheath of the flat cable.

As previously stated, the connector box 14 is secured to the pipe column 8 by means of a pair of metal straps 19, as shown in detail in Fig. 11. The lower connector 23 is provided with upper and lower pairs of lugs 48 adapted to receive the ends of the straps 19. One end of each strap is adjustably secured to the connector 23 by means of a clip 49, bolt 50, and nut 51.

Figure 11 illustrates the position of the offset pipe and the connector box in the well casing, showing the compact arrangement of parts whereby the cable and the connector box may be inserted in the casing alongside an offset discharge pipe of a size which will leave sufficient space for the round power cable and yet adequate to handle the full output of a pump of only slightly less diameter than the well casing.

Figure 12:
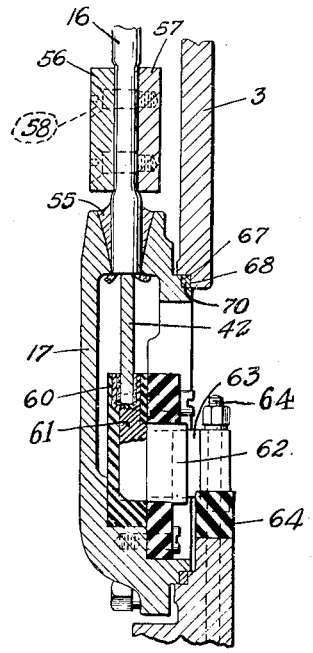
Figure 12 is a vertical section taken on line 12—12 of Fig. 2, showing the lower terminal box connecting the flat cable to the motor.
Figure 3:
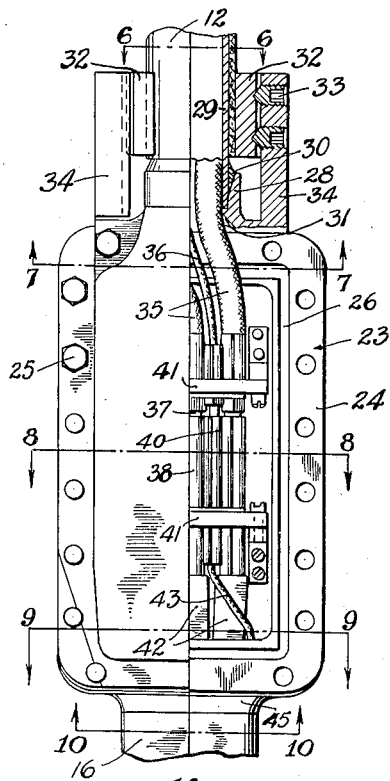
Figure 3 is a front elevation, partly in cross section, of the cable connector box shown in Fig. 1.

Referring to Fig. 12, the lower end of the flat cable 16 is connected in fluid-tight relation to the terminal box 17 detachably secured to the motor casing 3. The seal 55 between the cable and the box 17 is similar to that between the upper end of the cable and the connector box 23. The cable is additionally clamped to the terminal box by a pair of clamping plates 56, 57 disposed on opposite sides of the cable and urged into clamping engagement with the cable by screws 58 passing through upstanding lugs on the terminal box alongside the narrow edges of the cable. Each of the conductors 42 and 43 embedded in the cable extends into the terminal box and is inserted and soldered in a slot 60 extending across the top of the cable connector piece 61 provided with forked contacts 62 engaging knife blade 63 mounted on the copper stud 64 which is connected to a terminal of the motor windings. Complementary recesses 67 and 68 are formed on the open side of the terminal box and on the periphery of the opening in the motor casing, these recesses forming a closed annular channel for volumetrically confining a gasket 70 which seals the juncture of the terminal box and the motor casing.

The provision of the two piece connector box 14 enables shipping the flat cable separately from the round cable. The latter is wound on a reel and is shipped to the point of use separately from the motor pump unit. In order to avoid the danger of kinking the flat cable, which might result if unskilled operators in the field were to attempt to shape the cable to the longitudinal contour of the pump, it is preferred to perform this step in the factory where proper tools are available. Obviously, it would be impractical to ship the flat cable, when so shaped, attached to the reeled round cable. The preferred practice is to attach the flat cable to the motor and to the lowermost section of discharge column, if the motor pump unit is shipped as a unitary assembly. If, however, the unit is too long to ship fully assembled, the pump and motor are separated and in this case the flat cable is boxed separately.

Aside from these considerations, it would be possible to permanently connect the two cables together at the factory; however, with the construction described, the fluid-tight connections between the cables and the connector box and terminal box may be made before the unit is assembled, eliminating the necessity of special tools or skilled mechanics at the point of installation of the unit. The only operation required in the field to provide a completely sealed cable assembly is the bolting together of plane clamping surfaces between the two connectors 22 and 23 and between the terminal box 17 and the motor casing. It will also be seen that a connector box as described may be constructed with a thickness not exceeding the thickness of the round cable, and of such shape as to utilize to the fullest extent the space between the discharge pipe and the well casing.

It will be understood that in order to protect the interior of the connector box prior to connecting the sections together, blank shipping covers are bolted to the open faces of the two connectors. A similar protecting cover is provided for the terminal box 17.

An additional important feature of this invention is the arrangement whereby the interiors of both the flat and the round cable are filled with oil or other dielectric liquid up to a point above the level of the liquid in the well. As shown in Fig. 12, the terminal box 17 and the lower end of the flat cable are in open communication with the interior of the motor casing, which is filled with a dielectric liquid subjected to the hydrostatic pressure of the well liquid. The flat cable is so constructed as to provide space for the passage of liquid upwardly to the connector box 14, and the latter is in open communication with both cables. In both cables, the fabric wrappings and filler act as wicks, elevating the dielectric liquid rapidly. As a result of this arrangement, as the unit is lowered into the well and submerged in the well liquid the pressure of the latter forces dielectric liquid from the upper portion of the motor casing upwardly within the flat cable, through the connector box, and upwardly within the round cable. Inasmuch as the dielectric liquid is usually of less specific gravity than the well liquid, the level of the former will usually be above the level of the latter, and consequently in the event of any porosity in the metal sheath of the cable any leakage would be of dielectric liquid out of the cable instead of well liquid into the cable. With the connector box sealed at its upper end to the lead sheath of the round cable by a wiped joint, and similarly sealed at its lower end to the copper tube 44, and with the lower end of the copper tube similarly sealed to the terminal box 17, the continuous open communication through the boxes and cables is made possible.

I claim:

1. A structure for conducting electric current to a device positioned within a substantially cylindrical enclosure past apparatus therein having, beyond a predetermined point in said enclosure, a diameter relative to the enclosure diameter such that there is insufficient room for a round cable of necessary capacity, said conducting structure comprising a round electric cable adapted to extend from one end of the enclosure to said predetermined point, a relatively flat electric cable adapted to be connected to said device in fluid-tight relation therewith and extend from the other end to said predetermined point, the adjacent ends of said round and flat cables, respectively, being permanently connected in fluid-tight relation to individual cable connectors, and said cable connectors being detachably secured together in operable and fluid-tight relation.

2. A conducting structure as described in claim 1, in which said connectors comprise a pair of complementary wedge-shaped housing members, each having an open side and the two adapted to be detachably secured together in fluid-tight relation with said open sides in engagement and with the thick end of each member adjacent the thin end of the other member, said housing members when secured together forming a fluid-tight box of substantially uniform thickness.

3. A conducting structure as described in claim 1, for use with apparatus cylindrically convex in advance of and adjacent said predetermined point, in which said cable connectors when secured together form a connector box, one side of which is concave to conform substantially to the external contour of the cylindrically convex apparatus, the opposite side of said box being convex to conform substantially to the internal contour of the enclosure.

4. A conducting structure as described in claim 1, in which said round and flat cables comprise fluid-tight sheaths containing insulated conductors, there being space within said sheaths for the reception of fluid surrounding said conductors, the connector means on each cable comprising a housing in permanent fluid-tight relation with the sheath of its associated cable, and the two connector means being detachably securable together with their housings in fluid-tight connection, whereby the fluid-reception spaces in the two cables are interconnected with each other through said connector means.

VAINO A. HOOVER.